United States Patent
Huber et al.

(10) Patent No.: US 8,746,227 B2
(45) Date of Patent: Jun. 10, 2014

(54) METHOD FOR SLICING WAFERS FROM A WORKPIECE

(75) Inventors: Anton Huber, Burghausen (DE); Wolfgang Gmach, Emmerting (DE); Robert Kreuzeder, Wurmannsquick (DE); Peter Wiesner, Reut (DE)

(73) Assignee: Siltronic AG, Munich (DE)

( * ) Notice: Subject to any disclaimer, the term of this patent is extended or adjusted under 35 U.S.C. 154(b) by 145 days.

(21) Appl. No.: 13/415,863

(22) Filed: Mar. 9, 2012

(65) Prior Publication Data

US 2012/0240914 A1    Sep. 27, 2012

(30) Foreign Application Priority Data

Mar. 23, 2011   (DE) .......................... 10 2011 005 948

(51) Int. Cl.
*B23D 61/18* (2006.01)
(52) U.S. Cl.
USPC ................. 125/21; 125/16.02; 451/7; 451/53
(58) Field of Classification Search
USPC ........ 451/7, 53, 59; 125/12, 16.01, 16.02, 21; 83/651.1
See application file for complete search history.

(56) References Cited

U.S. PATENT DOCUMENTS

| | | | |
|---|---|---|---|
| 5,377,568 A * | 1/1995 | Hauser | 83/74 |
| 5,778,869 A * | 7/1998 | Toyama | 125/16.02 |
| 6,178,961 B1 * | 1/2001 | Nagatsuka et al. | 125/21 |
| 6,652,356 B1 * | 11/2003 | Ariga | 451/7 |
| 7,959,491 B2 * | 6/2011 | Kitagawa | 451/7 |
| 2002/0174861 A1 * | 11/2002 | Lundt et al. | 125/21 |
| 2007/0178807 A1 * | 8/2007 | Gupta et al. | 451/5 |
| 2010/0089377 A1 * | 4/2010 | Oishi et al. | 125/16.02 |
| 2010/0258103 A1 * | 10/2010 | Kitagawa | 125/21 |
| 2011/0088678 A1 * | 4/2011 | Kitagawa | 125/16.01 |

FOREIGN PATENT DOCUMENTS

| | | |
|---|---|---|
| DE | 69304212 T2 | 2/1997 |
| DE | 69629247 T2 | 1/2004 |
| JP | 5185419 A | 7/1993 |
| JP | 08290422 A | 5/1996 |
| JP | 10166354 A | 6/1998 |
| JP | 11277399 A | 10/1999 |
| JP | 2003145406 A | 5/2003 |

* cited by examiner

Primary Examiner — Eileen P. Morgan
(74) Attorney, Agent, or Firm — Leydig, Voit & Mayer, Ltd.

(57) ABSTRACT

A method for slicing wafers from a workpiece includes providing wire guide rolls each having a grooved coating with a specific thickness and providing rings at opposing ends of a first of the coatings of a respective wire guide roll. The rings are fixed exclusively to the first coating. A sawing wire including wire sections disposed in a parallel fashion is tensioned between the wire guide rolls. The wire sections of the sawing wire are moved relative to the workpiece so as to perform a sawing operation. A change in length of the first coating, brought about by a temperature change, is measured by measuring distances between sensors and the rings. The wire guide rolls are cooled in a manner dependent on the measured distances.

4 Claims, 2 Drawing Sheets

METHOD FOR SLICING WAFERS FROM A WORKPIECE

CROSS REFERENCE TO RELATED APPLICATIONS

This application claims priority to German Patent Application No. DE 10 2011 005 948.2 filed Mar. 23, 2011, which is hereby incorporated by reference herein in its entirety.

FIELD

The invention relates to a method for slicing wafers from a workpiece, in which during a sawing operation wire sections—arranged in a parallel fashion—of a sawing wire are guided relative to the workpiece, thus giving rise to the wafers.

BACKGROUND

A method for slicing wafers can be carried out using a wire saw. The basic construction and the functioning of a wire saw are described, for example, in US 2002/0174861 A1 or US 2010/0089377 A1. A suitable wire saw accordingly comprises at least two wire guide rolls around which a sawing wire is wound multiply. This gives rise to wire sections which are tensioned between two wire guide rolls and arranged in a parallel fashion and which form a wire web through which the workpiece is moved during the sawing operation. Wire sawing methods in which, instead, the wire web is moved through the workpiece are also known.

Appropriate workpieces include materials which are separated into wafers, in particular blocks composed of semiconductor material, from which semiconductor wafers are sliced.

The wire guide rolls have a coating having a specific thickness and having grooves that guide the wire sections. The region of the surface of the coating wears with the duration of the loading by the sawing operation. As long as the coating is still thick enough, the worn region of the surface of the coating can be removed by being ground away and the thinner coating regenerated in this way can continue to be used.

The sawing wire is wound from a supply spool onto a receiver spool during the sawing operation. In this case, the running direction of the sawing wire is usually changed cyclically, as a result of which more comprehensive utilization of the sawing wire is achieved.

Slicing the wafers uses abrasive grain that removes material from the workpiece in a cutting mode of operation. The abrasive grain can be fixedly bonded to the sawing wire. More often, use is instead made of a sawing slurry in which the abrasive grain is dispersed and which is fed to the wire web.

Semiconductor wafers which are produced in this way should have side surfaces that are as flat and plane-parallel as possible. In order that wafers having such a geometrical characteristic can arise, an axial relative movement between the workpiece and the wire sections, that is to say a relative movement parallel to the central axis of the workpiece, should be avoided during the sawing operation. If such a relative movement nevertheless takes place, wafers having a curved cross section arise. The degree of bending of the wafers is often specified by a characteristic value called warp.

As a cause of the occurrence of the abovementioned relative movement, changes in the length of the workpiece and of the wire guide rolls are mentioned in US 2010/0089377 A1, said changes being attributed to changes in temperature and an associated thermal expansion or thermal contraction. In actual fact, frictional heat is generated particularly during the movement of the sawing wire around the wire guide rolls and when the sawing wire engages into the workpiece, and, in particular, the temperature of the workpiece, of the wire guide rolls and of the bearings of the wire guide rolls is changed as a result of heat transport. US 2010/0089377 A1 describes a method in which the displacement of the workpiece in an axial direction is measured and the axial displacement of the wire guide rolls is regulated in such a way that it corresponds to that measured.

JP 10 166 354 A2 describes a method comprising measuring an axial displacement of the wire guide roll. For this purpose, the distance between a sensor and a measurement plate is measured, wherein the measurement plate is fixed to the wire guide roll.

SUMMARY

In an embodiment, the present invention provides a method for slicing wafers from a workpiece including providing wire guide rolls each having a grooved coating with a specific thickness and providing rings at opposing ends of a first of the coatings of a respective wire guide roll. The rings are fixed exclusively to the first coating. A sawing wire including wire sections disposed in a parallel fashion is tensioned between the wire guide rolls. The wire sections of the sawing wire are moved relative to the workpiece so as to perform a sawing operation. A change in length of the first coating, brought about by a temperature change, is measured by measuring distances between sensors and the rings. The wire guide rolls are cooled in a manner dependent on the measured distances.

BRIEF DESCRIPTION OF THE DRAWINGS

Exemplary embodiments of the present invention are described in more detail below with reference to the drawings, in which.

DETAILED DESCRIPTION

Figure 1:
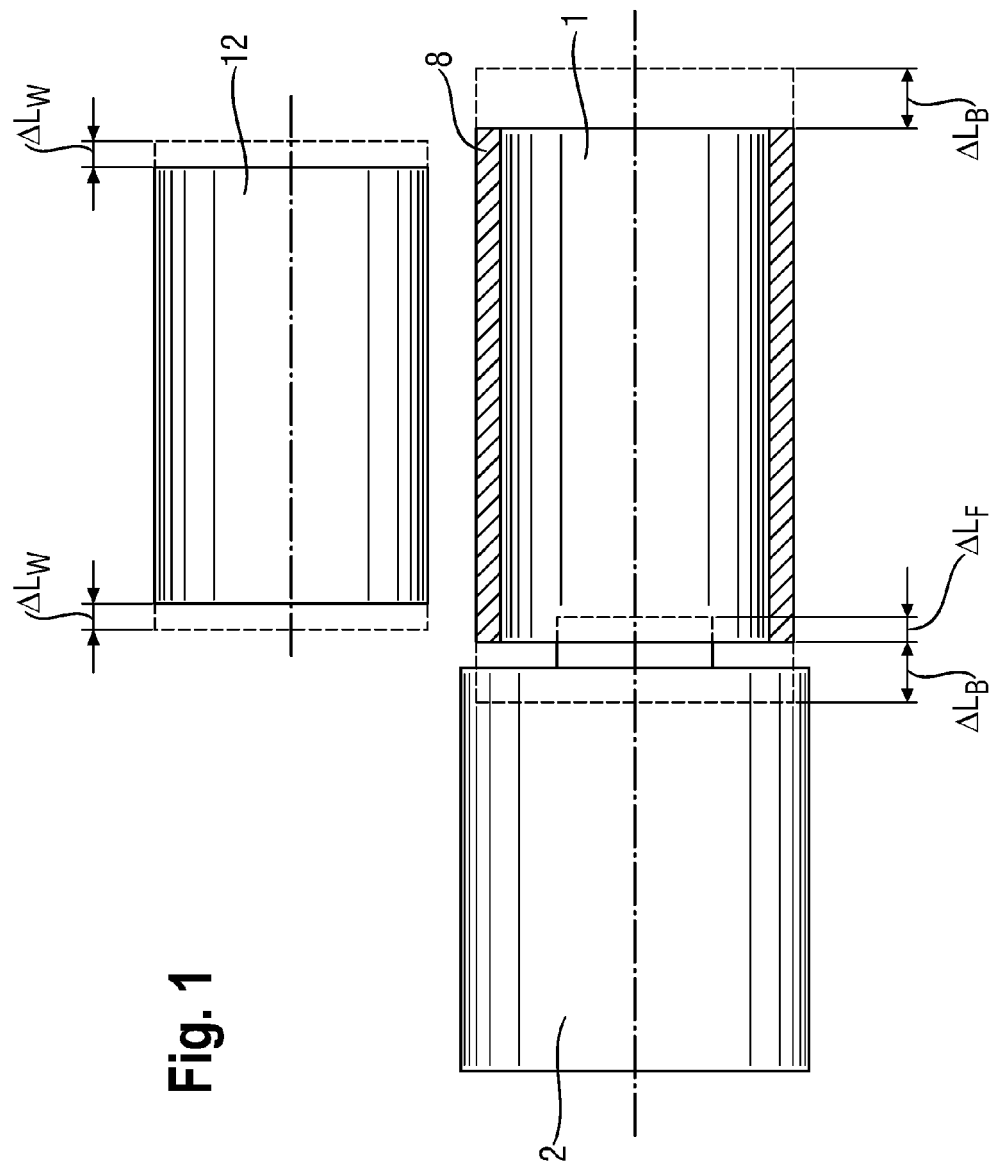
FIG. 1 schematically shows the changes in length that are crucially responsible for the fact that an axial relative movement between the workpiece and the wire sections can occur.

In an embodiment, the present invention provides a method for slicing wafers from a workpiece, comprising during a sawing operation moving wire sections—arranged in a parallel fashion—of a sawing wire relative to the workpiece, thus giving rise to the wafers, wherein the wire sections are tensioned between two wire guide rolls each having a grooved coating having a specific thickness; and measuring a change in the length of the coating of one of the wire guide rolls, said change being brought about by temperature change, with the aid of rings fixed exclusively to the coating at the ends of the coating, by measuring distances between sensors and the rings; and cooling the wire guide rolls in a manner dependent on the measured distances.

The inventors of the present invention have ascertained that the measurement of the distance between the sensor and a measurement plate fixed to the wire guide roll is unfavorable because this disregards a thermally governed change in the length of the coating of the wire guide roll. The change in the length of the coating should be taken into account because its contribution to the displacement of the wire sections from desired positions provided is greater than the contribution owing to a change in the length of the wire guide roll.

In an embodiment, the invention takes that into account by measuring how the length of the coating changes in the course of the sawing operation, and by cooling the wire guide rolls proportionally to the measured change in the length of the coating. Specifically, a change in the length of the coating, said change being brought about by temperature change, is measured with the aid of rings fixed exclusively to the coating at the ends of the coating, by measuring distances between sensors and the rings. The wire guide rolls are cooled in a manner dependent on the measured distances.

By virtue of the fact that the rings are arranged at the ends of the coating and are fixed exclusively to the coating, the axial position of the rings changes proportionally to the change in the length of the coating of the wire guide roll. With the coating of the wire guide roll and its change in length, the method takes account of the disturbance factor that is responsible for the most part for a possible axial relative movement between the workpiece and the wire sections.

The rings preferably consist of an electrically conductive material, for example metal or graphite. The measurement of the distances is preferably performed in a manner representative of both wire guide rolls of the wire web only at one of the wire guide rolls. However, it is likewise possible to perform corresponding measurements on both wire guide rolls of the wire web, and to cool the wire guide rolls in a manner dependent on the distances respectively measured.

In accordance with a first embodiment of the invention, the process of cooling the wire guide rolls is effected in such a way that the difference with respect to distances that existed between the sensors and the rings before the sawing operation becomes smaller or zero. To put it another way, the wire guide rolls are cooled in such a way that thermally governed changes in the length of the coating of the wire guide rolls during the sawing operation are as far as possible reversed.

In accordance with a second embodiment of the invention, the process of cooling the wire guide rolls is effected in such a way that the reaction to a thermally governed change in the length of the workpiece comprises an equidirectional thermally governed change in the length of the coating of the wire guide rolls. To put it another way, the wire guide rolls are cooled in such a way that a thermally governed change in the length of the workpiece is as far as possible compensated for by a thermally governed change in the length of the coating of the wire guide rolls.

In accordance with one preferred variant of the method, which can be combined with the first or the second embodiment, the wire guide rolls and their fixed bearings are cooled independently of one another. This variant additionally takes account of the influence of a thermally governed linear expansion of the fixed bearing during the sawing operation.

The change in the length of the workpiece during the sawing operation is dependent on the length of the workpiece before the sawing operation, and on the amount of heat that arises during the sawing operation. The latter is dependent on the process conditions chosen, which are described by a totality of different process parameters. These process parameters include, in particular, the speed of the sawing wire, the amount and temperature of the sawing slurry fed to the wire web, the advancing speed at which the workpiece is moved through the wire web, the type of abrasive grain and the type of carrier material with which the workpiece is held. If the process conditions chosen remain unchanged over a plurality of sawing operations, the change in the length of the workpiece during one of the sawing operations is dependent only on the length of the workpiece before the sawing operation.

For sawing operations which proceed under the same process conditions, therefore, it suffices once to separate a workpiece into wafers under the process conditions chosen and to measure the temperature of the workpiece during the sawing operation. Afterward, for this sawing operation and for all other sawing operations which are intended to proceed under the process conditions chosen and by means of which material of the same type is intended to be cut, it is possible to create a curve that predicts the change in the length of a workpiece as a function of the cutting depth or the duration of the sawing operation. The change in length can be calculated with the aid of the coefficient of linear expansion of the material of the workpiece, the measured temperature profile and the length of the workpiece before the respective sawing operation.

The process of cooling the respective wire guide roll and the respective fixed bearing is preferably effected in such a way that at every point in time in the sawing operation the difference $\Delta L_W(x)-(\Delta L_F+\Delta L_B(x))$ is less than 20 µm, wherein $\Delta L_W(x)$ is the axial displacement experienced by an axial position x on the workpiece on account of a change in the length of the workpiece that is caused by the change in the temperature of the workpiece, $\Delta L_F$ is the change in length experienced by the respective fixed bearing as a result of the change in the temperature of the fixed bearing, and $\Delta L_B(x)$ is the axial displacement experienced by the axial position x on the coating of the wire guide roll on account of a change in the length of the coating that is caused by the change in the temperature of the coating. The axial position x is a position on the central axis of the workpiece or an equivalent position.

The greater the difference, the further away the wire sections are from the desired positions that would ensure a straight cut through the workpiece. Moreover, without countermeasures, the difference becomes all the greater, the greater the distance between the axial position x and the center of the wire guide roll. That should be taken into account particularly when a plurality of workpieces are arranged alongside one another in order to saw them simultaneously. Such an arrangement of workpieces is implemented in order that the available wire web can be utilized as completely as possible.

It is preferred to react to an axial displacement $\Delta L_W(x)$ by cooling the respective wire guide roll and the respective fixed bearing in such a way that the difference $\Delta L_W(x)-(\Delta L_F+\Delta L_B(x))$ is less than 20 µm.

That can be done by measuring the axial change in the length of the coating of the wire guide roll during the sawing operation, and likewise the axial change in the length of the fixed bearing, and regulating the cooling of the wire guide rolls and the fixed bearings thereof in a manner dependent on the measured changes in length in a manner independent of one another.

That can alternatively also be done by cooling the workpiece in such a way that $\Delta LW(x)$ is less than 5 µm during the sawing operation, and cooling the wire guide rolls and the fixed bearings thereof in a manner independent of one another in such a way that the sum $(\Delta L_F+\Delta L_B(x))$ during the sawing operation is less than 25 µm, preferably less than 10 µm.

It is particularly advantageous to completely suppress changes in temperature and associated changes in length of the workpiece and of the fixed bearing and of the coating of the respective wire guide roll during the sawing operation.

A method according to an embodiment of the invention is preferably used to produce wafers having side surfaces that are as plane-parallel as possible. However, this also does not rule out modifying the aim of the method and producing wafers having a specific intended bending.

The workpiece is typically held during the sawing operation in such a way that it can axially expand or contract in the event of a change in temperature at both ends. It consists, for example, of polycrystalline or monocrystalline semiconductor material, in particular of silicon. It typically has the form of a cylindrical rod portion having a diameter that suffices in order to be able to produce wafers having a diameter in the range of 200 to 450 mm.

A single crystal composed of silicon which is separated to form semiconductor wafers having a diameter of 300 mm experiences, during the sawing operation, a maximum change in temperature of an order of magnitude of typically 30° C., which corresponds to a maximum change in length of an order of magnitude of typically 25 μm. The specified orders of magnitude are typical of methods in which the single crystal is not cooled.

The change in the length of the coating of the wire guide roll during the sawing operation on account of a change in the temperature of the coating is dependent, in particular, on the coefficient of linear expansion of the material of the coating, on the thickness of the coating and on the amount of heat that arises during the sawing operation. The latter is crucially influenced by the process conditions and the length of the workpiece before the sawing operation. For sawing operations which are carried out under the same process conditions and with coating material of the same type, the change in the length of the coating is only dependent on the length of the workpiece and on the thickness of the coating.

The coating is typically fixed on the core of the wire guide rolls in such a way that it can axially expand or contract in the event of a temperature change in an unimpeded manner at both ends. However, the change in the length of the coating can be restricted within certain limits by virtue of the coating being clamped onto the underlying core of the wire guide roll, for example by clamping rings arranged at both ends of the coating. The clamping rings fix the coating on the core of the wire guide roll and restrict a change in the length of the coating that is caused by a change in temperature. Clamping the coating onto the core of the wire guide roll is appropriate particularly when the intention is to permit a smallest possible or no thermally governed change in the length of the coating of the wire guide roll.

Given a typical thickness of the coating of 6 mm, a coating composed of polyurethane experiences, during the process of slicing the wafers from the abovementioned single crystal composed of silicon without taking account of cooling measures and without taking account of the clamping of the coating on the core of the wire guide roll, a maximum change in temperature of an order to magnitude of typically 20° C. and a maximum linear expansion of an order of magnitude of typically 80 μm. Accordingly, the coating is subjected to a significantly greater change in length than the single crystal.

The wire guide rolls clamping the wire web are typically mounted in each case by means of a shaft in a fixed bearing and a movable bearing. In the event of a change in temperature, the fixed bearing cannot axially expand or contract at both ends, but rather only at the end lying opposite the movable bearing. A change in the length of the fixed bearing displaces the coating of the wire guide roll and thus each of the wire sections by a uniform magnitude.

In the case of a typical configuration of the fixed bearing, the fixed bearing experiences, during the process of slicing the wafers from the abovementioned single crystal composed of silicon without taking account of cooling measures, a maximum change in temperature of an order of magnitude of typically 1.5° C. and a maximum linear expansion of an order of magnitude of typically 6 μm.

FIG. 1 is a schematic sectional illustration through the workpiece 12, the wire guide roll 1 and the fixed bearing 2.

The illustration shows the changes in length that are crucially responsible for the fact that an axial relative movement between the workpiece and the wire sections can occur. These include the change in length $\Delta L_W$ of the workpiece 12, the change in length $\Delta L_B$ of the coating 8 of the wire guide roll 1 and the change in length $\Delta L_F$ of the fixed bearing 2. For the sake of simplicity, the changes in length $\Delta L_B$ and $\Delta L_W$ are illustrated as if the fixed bearing and the wire guide roll were not connected to one another. Accordingly, a point with an axial position at the ends of the workpiece is displaced by the magnitude $\Delta L_W$ on account of thermal expansion of the workpiece, and a point with an axial position at the ends of the coating of the wire guide roll is displaced by the magnitude $\Delta L_B$ on account of thermal expansion of the coating.

Figure 2:
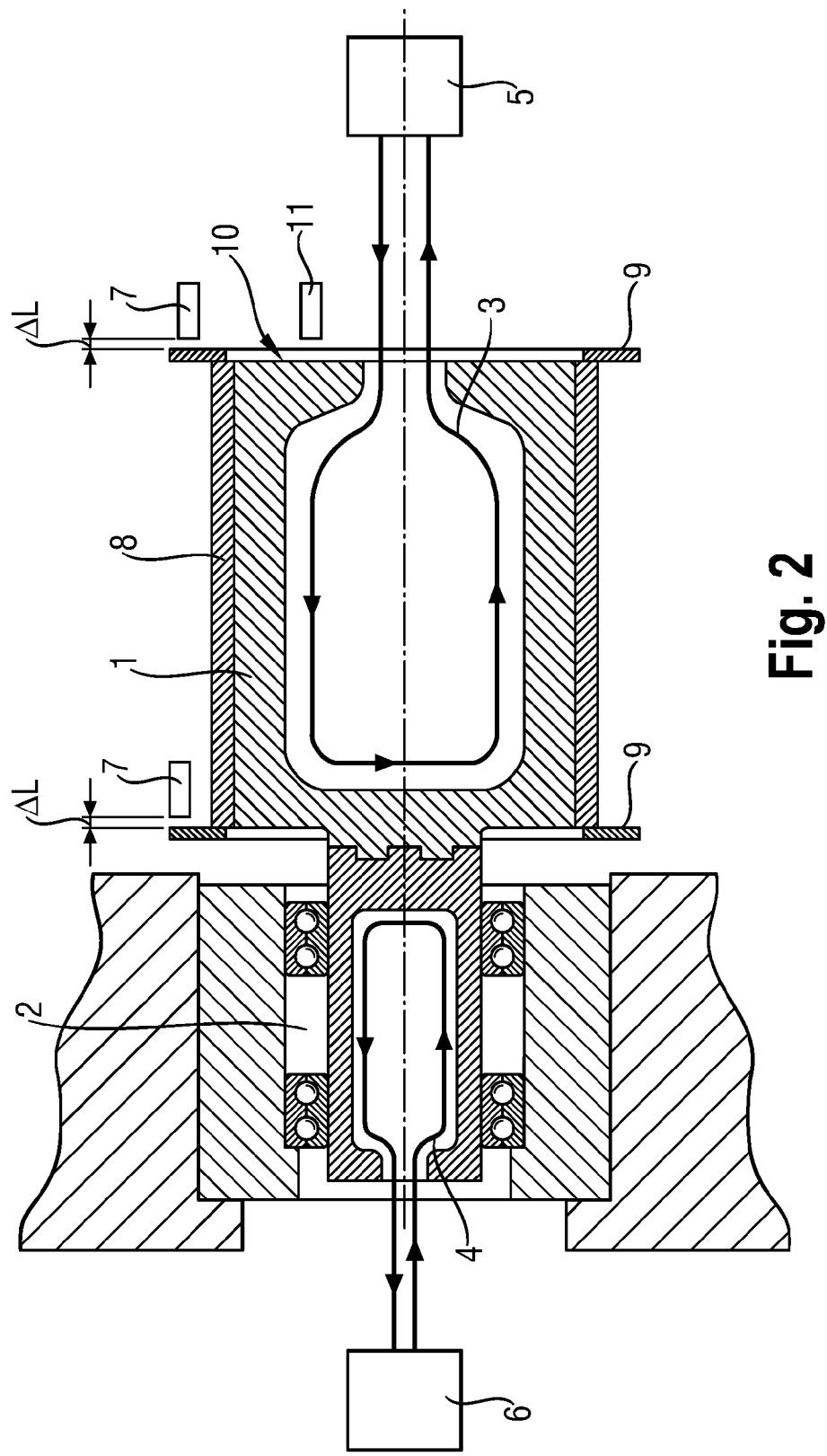
FIG. 2 shows in cross section a wire guide roll suitable for use in the method according to the invention, and the fixed bearing associated with said wire guide roll.

The illustration in accordance with FIG. 2 shows that the wire guide roll 1 and the fixed bearing 2 associated therewith respectively have channels 3 and 4 connected to cooling circuits that are supplied with coolant independently of one another. The cooling circuit of the wire guide roll 1 is embodied in such a way that a coolant such as water, for example, is conducted through rotary leadthroughs into the wire guide roll 1 that rotates during the sawing operation.

Respectively incorporated into the cooling circuits are heat exchangers, control units 5 and 6, and also sensors 7 which supply two control loops that operate independently of one another for cooling the wire guide roll 1 and the fixed bearing 2 with measurement signals. The measurement signals supplied by the sensors 7 are converted, in the control units 5 and 6, into cooling parameters as manipulated variables for cooling the wire guide roll 1 and the fixed bearing 2 in a manner independent of one another.

The sensors 7 measure the distance $\Delta L$ from respectively assigned rings 9 arranged at the ends of the coating 8 of the wire guide roll 1. The rings 9 are fixed to the coating 8 itself and exclusively have contact with the coating 8. If it is desired to take account of the change in the length of the core of the wire guide roll, a further sensor 11 can be provided, which measures the distance from the core 10 of the wire guide roll. The core 10 of the wire guide roll 1 is usually produced from Invar, such that its influence on the change in the axial position of the wire sections is correspondingly small.

EXAMPLE

Single crystals composed of silicon having a diameter of 300 mm were separated into wafers by means of a wire saw comprising four wire guide rolls. The wire guide rolls clamping the wire web and their associated fixed bearings had the structure shown in FIG. 2 and were cooled according to an embodiment of the invention. The measurement according to an embodiment of the invention of the distances between the sensors and the rings was effected in a manner representative of both wire guide rolls of the wire web on one of the wire guide rolls.

While the invention has been particularly shown and described with reference to preferred embodiments thereof, it will be understood by those skilled in the art that various changes in form and details may be made therein without departing from the spirit and scope of the invention.

What is claimed is:
1. A method for slicing wafers from a workpiece, the method comprising:
   providing wire guide rolls each having a core and a coating with a specific thickness and an axial length, wherein a fixed bearing having an axial length is associated with each of the wire guide rolls;

providing rings at opposing ends of the coating of at least one of the wire guide rolls, the rings being fixed exclusively to the coating;

providing a sawing wire including wire sections disposed in a parallel fashion, the wire sections being tensioned between the wire guide rolls;

moving the wire sections of the sawing wire relative to the workpiece so as to perform a sawing operation;

measuring a change in the axial length of the coating by measuring distances between sensors and the rings, the change in the axial length being brought about by a temperature change;

measuring a change in the axial length of the fixed bearing associated with the at least one of the wire guide rolls; and cooling the wire guide rolls and the respective associated fixed bearings in a manner independent of one another and dependent on the measured change in the axial lengths of the coating and of the fixed bearing.

2. The method recited in claim 1, wherein the cooling the wire guide rolls and the respective associated fixed bearings is carried out so as to reduce a difference between the measured distances between the sensors and rings during the sawing operation and the measured distances between the sensors and rings that existed before the sawing operation.

3. The method recited in claim 1, wherein the cooling the wire guide rolls and the respective associated fixed bearings is carried out such that a thermally governed change in a length of the workpiece is compensated for by a thermally governed change in the axial length of each respective coating of the respective wire guide roll.

4. The method recited in claim 1, further comprising clamping each respective coating to the core of the respective wire guide roll.

* * * * *